No. 881,922. PATENTED MAR. 17, 1908.
A. W. HARDY.
MILKING APPARATUS.
APPLICATION FILED NOV. 30, 1907.

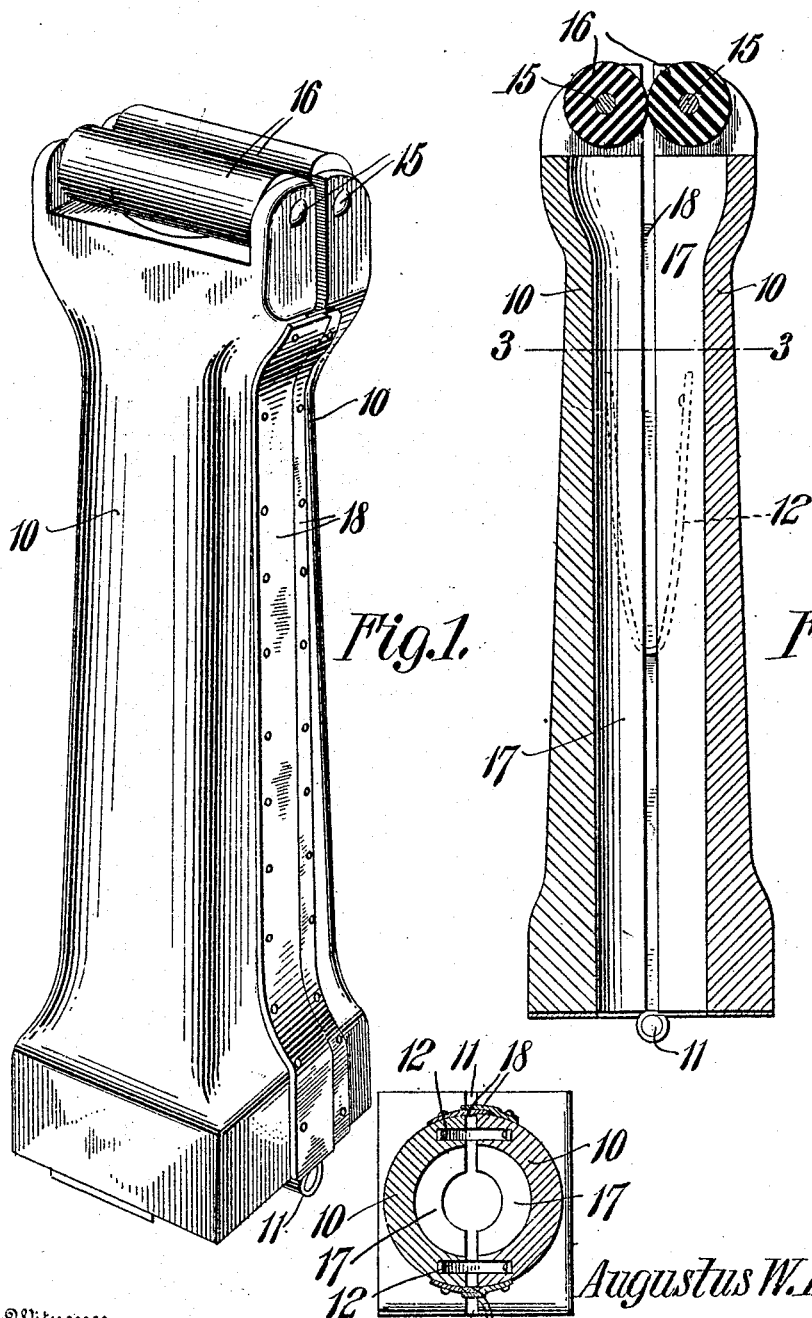

2 SHEETS—SHEET 2.

Augustus W. Hardy,
Inventor

Witnesses

By C. A. Snow & Co.
Attorneys

UNITED STATES PATENT OFFICE.

AUGUSTUS WILIAMS HARDY, OF MAY, TEXAS.

MILKING APPARATUS.

No. 881,922.      Specification of Letters Patent.      Patented March 17, 1908.

Application filed November 30, 1907. Serial No. 404,608.

*To all whom it may concern:*

Be it known that I, AUGUSTUS W. HARDY, a citizen of the United States, residing at May, in the county of Brown and State of Texas, have invented a new and useful Milking Apparatus, of which the following is a specification.

This invention relates to devices of that class employed for milking cows, and has for its principal object to provide a novel form of manually operable device by which pressure may be exerted on the teats for the purpose of forcing out the milk, the degree of pressure being directly under the control of the operator.

A further object of the invention is to provide a device of this class in which the milking may be accomplished without contact of the hands of the operator with either the teats or with the milk, thus minimizing the danger of the introduction of disease germs or bacillus into the milk.

A still further object of the invention is to provide a manually operable device of this class in which a pair of hinged or similarly connected members are arranged to form a milk duct, and which carry at the top rollers for engaging the teats.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 4:
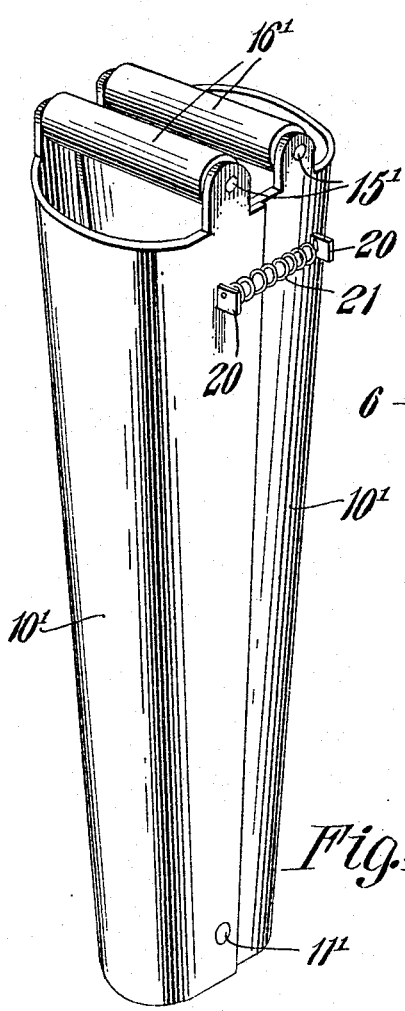
Figure 5:
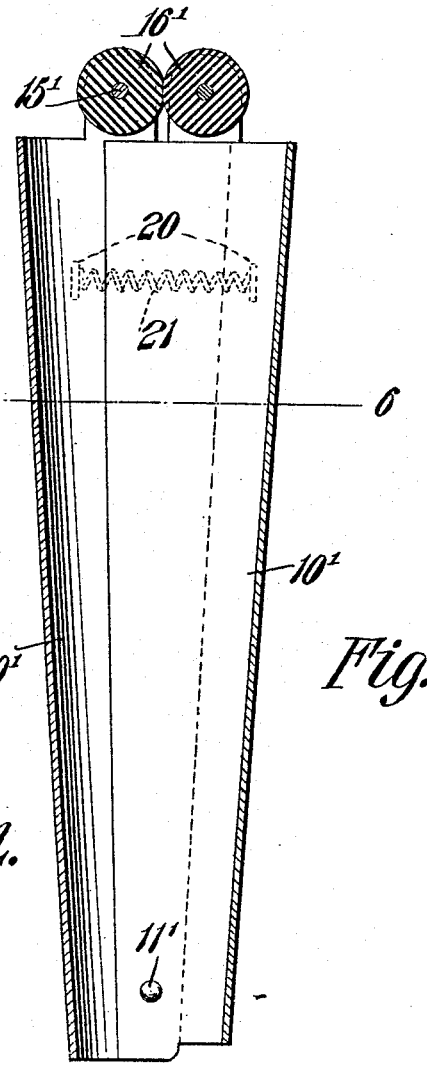
Figure 6:
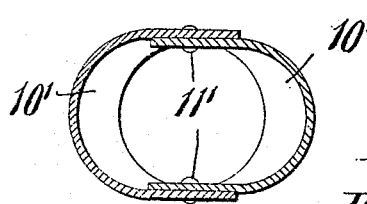

In the accompanying drawings:—Figure 1 is a perspective view of a milking apparatus constructed in accordance with the invention. Fig. 2 is a longitudinal sectional view of the same. Fig. 3 is a sectional plan view on the line 3—3 of Fig. 2. Fig. 4 is a perspective view illustrating a slight modification of the invention. Fig. 5 is a longitudinal sectional view of the same. Fig. 6 is a sectional plan view on the line 6—6 of Fig. 5.

Similar numerals of reference are employed to indicate corresponding parts throughout the several figures of the drawings.

In carrying out the invention, a pair of arms 10 formed of any suitable material are connected at the lower end by a hinge 11 that is disposed at one side of the arms, and the two arms are normally held separated by a pair of springs 12. The top of each arm is bifurcated, forming ears for the passage of pins 15, on which are mounted rollers 16, that are formed of hard rubber or other suitable material, these rollers being designed for engagement with the teats of the cow. The central portions of the arms are somewhat reduced in cross section and are rounded so that they may be conveniently grasped in one hand, and the operator in practice may wear sterilized gloves, so as to avoid direct contact of the hand with the teats or milk.

The inner walls of the arms are provided with channels 17 through which the milk may flow from the upper to the lower ends of the arms and directed into a suitable pail or other receptacle. In order to prevent the lateral escape of the milk, each arm is provided with projecting wings 18 that overlap so as to form a practically closed passage from top to bottom of the arms.

In practice, the device is grasped in one hand and the arms being opened by the springs, the rollers are placed on either side of the teat and forced together under any suitable degree of pressure for the purpose of expelling the milk, the device being manipulated in practically the same manner as practiced in hand milking.

In the construction illustrated in Figs. 4, 5 and 6, the milk device is formed wholly of sheet metal. The handle members 10' are in the form of transversely curved sheet metal plates, the edges of which continuously overlap so as to form a wholly inclosed channel from top to bottom. The upper ends of these plates are provided with integral ears which are perforated for the reception of the spindles 15' of the teat engaging rollers 16'. At the lower ends of the plates, rivets 11' are employed, these rivets forming hinge points in order to permit free movement of the members toward and from each other. Near the upper end of each of the members 10' is a pair of projecting lugs 20 and extending between these lugs are compression springs 21 that serve to spread the members in order that the rollers may engage the teat.

I claim:—

1. A milking device comprising a pair of arms, the inner walls of which are channeled to form a milk passage, and rollers arranged at the upper ends of said arms for engagement with the teat.

2. A milking device comprising a pair of arms, the inner walls of which are channeled to form a milk passage, overlapping wings at the outer edges of the arms, and rollers journaled at the upper ends of said arms for engagement with the teat.

3. A milking device comprising a pair of arms hinged at their lower ends, and the inner walls of which are channeled to form a milk passage, wings arranged at the outer edges of said arms and overlapping to close the passage, springs tending to maintain the arms in open position, and a pair of rollers journaled at the upper ends of the arms for engagement with the teat.

4. A milking device comprising a pair of channeled arms, pivoted together, and the edges of which overlap to form a continuous closed channel from top to bottom of said arms, and teat engaging devices at the upper ends of said arms.

In testimony that I claim the foregoing as my own, I have hereto affixed my signature in the presence of two witnesses.

AUGUSTUS WILIAMS HARDY.

Witnesses:
E. L. STRICKLAND,
B. H. BETTIS.